United States Patent
Yokono

(10) Patent No.: US 8,634,612 B2
(45) Date of Patent: Jan. 21, 2014

(54) IMAGE PROCESSING APPARATUS, IMAGE PROCESSING METHOD, AND PROGRAM

(75) Inventor: Jun Yokono, Tokyo (JP)

(73) Assignee: Sony Corporation, Tokyo (JP)

( * ) Notice: Subject to any disclaimer, the term of this patent is extended or adjusted under 35 U.S.C. 154(b) by 989 days.

(21) Appl. No.: 12/719,638

(22) Filed: Mar. 8, 2010

(65) Prior Publication Data

US 2010/0246908 A1     Sep. 30, 2010

(30) Foreign Application Priority Data

Mar. 25, 2009   (JP) ................ P2009-073143

(51) Int. Cl.
*G06K 9/00* (2006.01)
*G06K 9/56* (2006.01)

(52) U.S. Cl.
USPC ............. 382/128; 382/170; 382/205

(58) Field of Classification Search
USPC .......................................... 382/128
See application file for complete search history.

(56) References Cited

U.S. PATENT DOCUMENTS

| | | | |
|---|---|---|---|
| 7,130,469 B2 * | 10/2006 | Adachi | 382/224 |
| 7,315,635 B2 | 1/2008 | Oosawa | |
| 7,483,554 B2 * | 1/2009 | Kotsianti et al. | 382/128 |
| 2002/0186875 A1 * | 12/2002 | Burmer et al. | 382/133 |
| 2007/0236707 A1 * | 10/2007 | Shoda | 358/1.2 |
| 2007/0276225 A1 * | 11/2007 | Kaufman et al. | 600/416 |

FOREIGN PATENT DOCUMENTS

JP       2004-8419       1/2004

* cited by examiner

*Primary Examiner* — Sind Phongsvirajati
*Assistant Examiner* — John Go
(74) *Attorney, Agent, or Firm* — Finnegan, Henderson, Farabow, Garrett & Dunner, L.L.P.

(57) ABSTRACT

An image processing apparatus identifies tissues in respective parts of a tissue image. A tissue image subdivider subdivides a tissue image for identification into local regions. A detector detects texture feature values of the local regions. A determining unit compares the detected texture feature value of a local region to a learned feature value for identification associated with a predetermined tissue, and on the basis of the comparison result, determines whether or not the local region belongs to the predetermined tissue.

11 Claims, 10 Drawing Sheets

IMAGE PROCESSING APPARATUS, IMAGE PROCESSING METHOD, AND PROGRAM

BACKGROUND OF THE INVENTION

1. Field of the Invention

The present invention relates to an image processing apparatus, an image processing method, and a program. More particularly, the present invention relates to an image processing apparatus, an image processing method, and a program favorable for use in analyzing a tissue image obtained from an organism by tomography, and identifying the locations of various parts, such as the brain, liver, intestines, and bone, in the tissue image.

2. Description of the Related Art

Several technologies exist for acquiring an internal image of an object without incision, such as X-ray CT (Computed Tomography), MRI (Magnetic Resonance Imaging), and FMRI (Functional Magnetic Resonance Imaging). Such technologies are particularly used in medical fields to sectionally image a person (i.e., a patient), and then identify pathological foci from the sectional images (i.e., tomographs) obtained as a result.

Initially, a doctor or other person would use his or her experience as a basis for identifying which locations in a tissue image or other tomograph belong to particular tissues (such as the brain, liver, intestines, and bone). A method for automating identification also exists, wherein tissue outlines and textures (i.e., patterns in the image) are registered in advance, and compared against a tissue image of an identification target. (See, for example, Japanese Unexamined Patent Application Publication No. 2004-8419.)

SUMMARY OF THE INVENTION

However, when tissue outlines are used as in the above method, the tissue outlines can change greatly depending on the tomographic position (i.e., the position of the particular slice). Consequently, the tomographic positions of a tissue image to be identified become restricted.

Furthermore, tissue outlines may differ due to individual variability in organisms. In the case of tissues such as bone, such outlines become inconsistent. For this and other reasons, the above method is not appropriate in some cases, and respective parts in a tissue image might not be correctly identified.

In light of such circumstances, it is desirable to provide means enabling the texture features of tissue to be used as a basis for correctly identifying the tissues to which the respective parts of a tissue image belong.

An image processing apparatus in accordance with an embodiment of the present invention is configured to identify tissues in respective parts of a tissue image, and includes: subdividing means configured to subdivide a tissue image for identification into local regions; detecting means configured to detect texture feature values of the local regions; and determining means configured to compare the detected texture feature value of a local region to a learned feature value for identification associated with a predetermined tissue, and on the basis of the comparison result, determine whether or not the local region belongs to the predetermined tissue.

The image processing apparatus may also include learning means configured to learn the feature value for identification associated with a predetermined tissue.

The learning means may include: specifying means configured to specify a local region for a part belonging to a predetermined tissue in a learning tissue image; first extracting means configured to extract, from the learning tissue image, pixel blocks of predetermined size, each pixel block being centered about a respective pixel in a specified local region; first encoding means configured such that, for each extracted pixel block, pixel values of a plurality of pixels belonging to that pixel block are encoded into one of multiple possible code patterns; first generating means configured to generate a local region histogram for each specified local region, the local region histogram indicating respective occurrence frequencies of the encoded code patterns; and computing means configured to apply statistical learning using the generated local region histograms to compute a feature value histogram for use as the feature value for identification associated with a predetermined tissue.

The detecting means may include: second extracting means configured to extract, from the tissue image for identification, pixel blocks of predetermined size, each pixel block being centered about a respective pixel in one of the local regions into which the tissue image for identification was subdivided; second encoding means configured such that, for each extracted pixel block, pixel values of a plurality of pixels belonging to that pixel block are encoded into one of multiple possible code patterns; and second generating means configured to generate a local region histogram for each specified local region, the local region histogram indicating respective occurrence frequencies of the encoded code patterns and generated for use as the texture feature value of that local region.

The first and second encoding means may also be configured to encode the pixel values of a plurality of pixels belonging to a given pixel block into one of multiple possible code patterns by means of LBP (Local Binary Patterns).

The computing means may also be configured to apply AdaBoost learning using the generated local region histograms to compute a feature value histogram for use as the feature value for identification associated with a predetermined tissue.

The tissue image may be a virtual slide.

An image processing method in accordance with another embodiment of the present invention is executed in an image processing apparatus configured to identify tissues in respective parts of a tissue image. The method includes the steps of: subdividing a tissue image for identification into local regions; detecting texture feature values of the local regions; and comparing the detected texture feature value of a local region to a learned feature value for identification associated with a predetermined tissue, and on the basis of the comparison result, determining whether or not the local region belongs to the predetermined tissue.

A program in accordance with another embodiment of the present invention is a control program for an image processing apparatus configured to identify tissues in respective parts of a tissue image. The program causes the computer of the image processing apparatus to execute the steps of: subdividing a tissue image for identification into local regions; detecting texture feature values of the local regions; and comparing the detected texture feature value of a local region to a learned feature value for identification associated with a predetermined tissue, and on the basis of the comparison result, determining whether or not the local region belongs to the predetermined tissue.

In an embodiment of the present invention, a tissue image to be identified is subdivided into local regions, texture feature values are detected for the local regions, and the detected local region texture values are compared to a learned feature value for identification that is associated with a predetermined tissue. On the basis of the comparison result, it is determined whether or not a given local region belongs to the predetermined tissue.

According to an embodiment of the present invention, the tissues to which respective parts of a tissue image belong can be accurately identified.

DESCRIPTION OF THE PREFERRED EMBODIMENTS

Hereinafter, preferred embodiments for carrying out the invention (hereinafter referred to as embodiments) will be described in detail and with reference to the accompanying drawings. The description will proceed in the following order.

1. First Embodiment

Exemplary Configuration of Learning-Based Identification Apparatus

Figure 1:
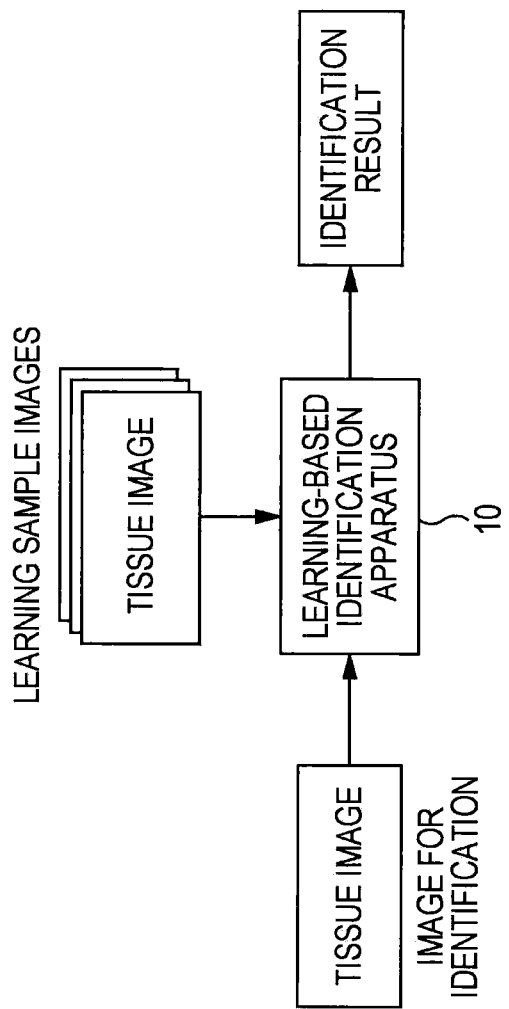
FIG. 1 is a diagram summarizing the operation of a learning-based identification apparatus to which an embodiment of the present invention has been applied.

FIG. 1 is a diagram summarizing the operation of a learning-based identification apparatus in accordance with an embodiment of the present invention. On the basis of a tissue image provided as a learning sample image, the learning-based identification apparatus 10 learns texture features of tissues (such as the brain, liver, intestines, and bone). On the basis of the learning results, the learning-based identification apparatus 10 identifies which coordinates belong which tissues in a tissue image input as an identification target image.

Herein, the tissue images used as the learning sample image and the identification target image are assumed to be virtual slides. However, sectional images obtained by X-ray CT, MRI, FMRI, or other means may also be used as the tissue images used herein as the learning sample image and the identification target image.

Figure 2:
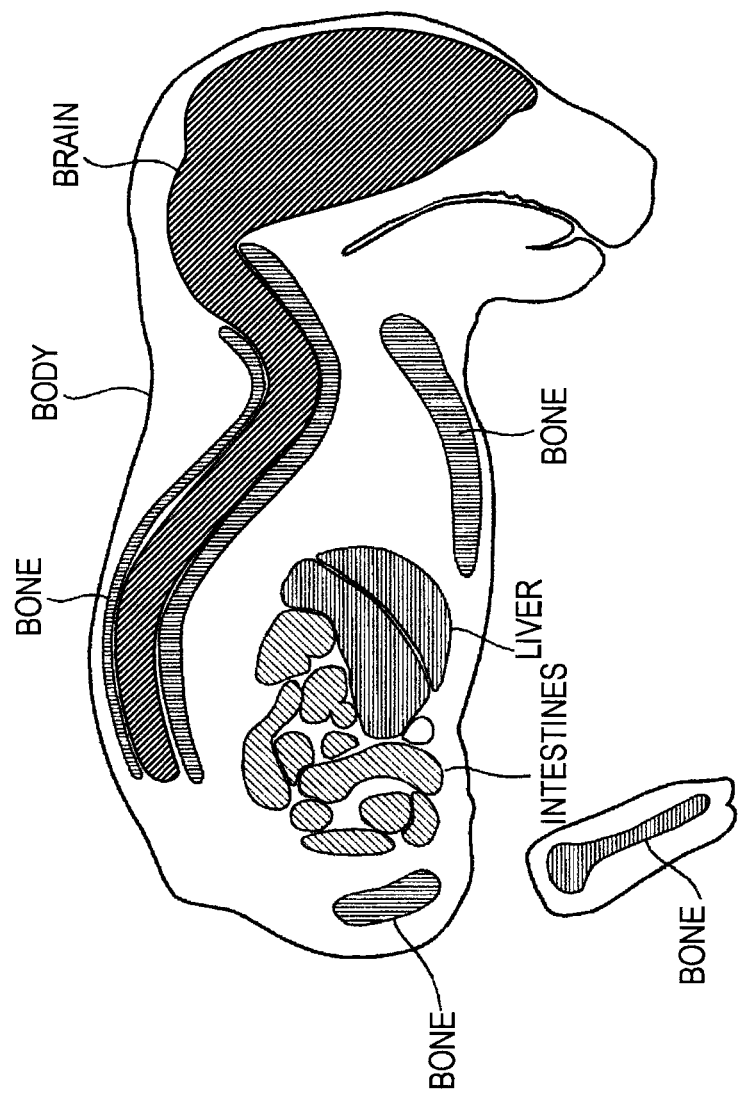
FIG. 2 is a simplified illustration of a tissue image used as a learning sample image.

FIG. 2 illustrates, in simplified form, a tissue image used as a learning sample image. The tissue image herein shows a cross-sectional slice of a mouse. The learning sample image is supplied in a state where the tissues at respective locations (in the case of FIG. 2, the brain, liver, intestines, and bone) have been identified by one or more persons in advance.

Figure 3:
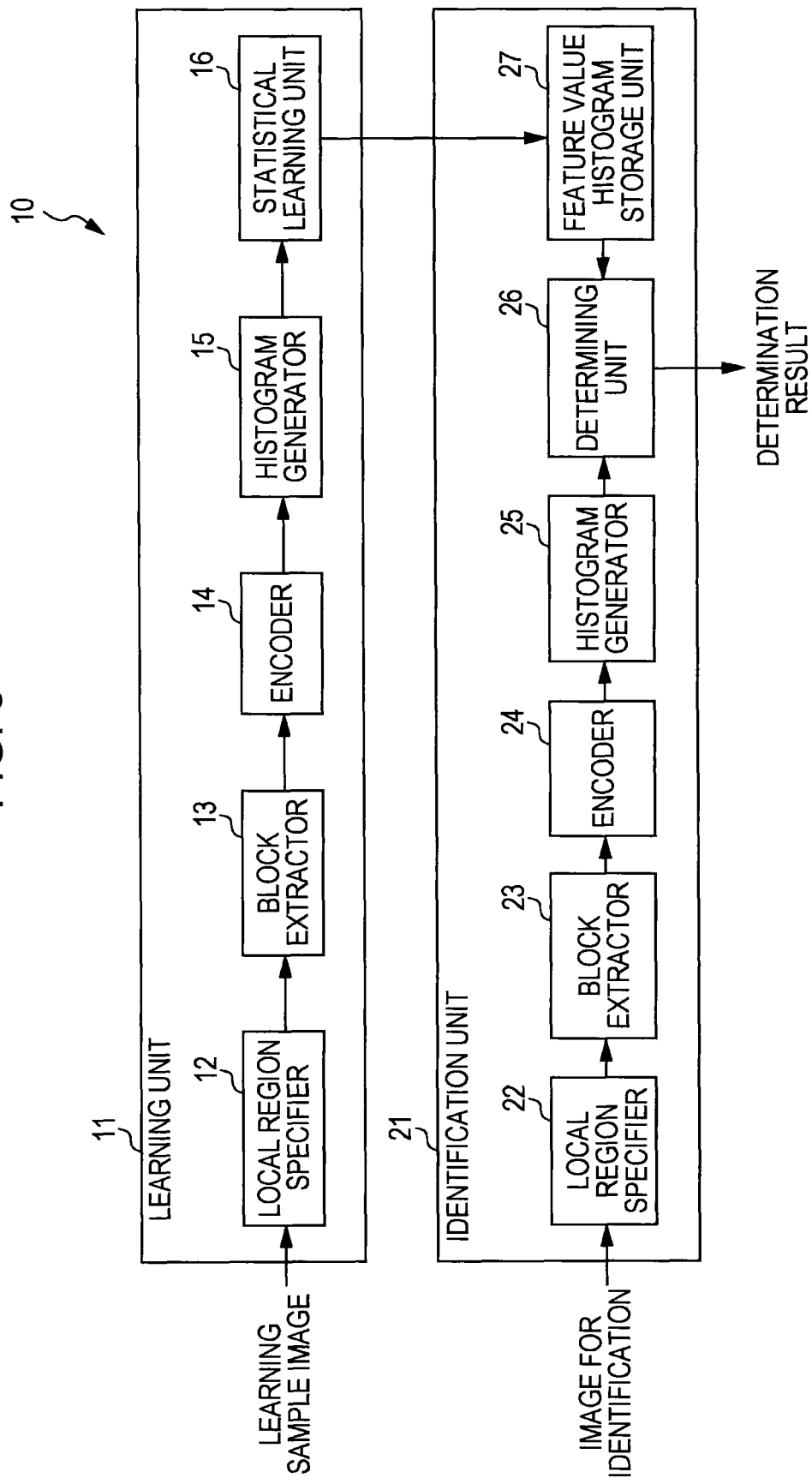
FIG. 3 is a block diagram illustrating an exemplary configuration of a learning-based identification apparatus.

FIG. 3 illustrates an exemplary configuration of the learning-based identification apparatus 10. The learning-based identification apparatus 10 can be sectioned into a learning unit 11, which learns texture features of tissues on the basis of a learning sample image, and an identification unit 21, which identifies the tissues to which respective locations in an identification target image belong.

[Detailed Exemplary Configuration of Learning Unit 11]

The learning unit 11 includes a local region specifier 12, a block extractor 13, an encoder 14, a histogram generator 15, and a statistical learning unit 16.

From a learning sample image, the local region specifier 12 selects a local region for a part whose tissue is being identified. Herein, the size of a local region is determined by the identification accuracy, which depends on the resolution of the tissue image and the identification unit 21. In the description hereinafter, the local region size is taken to be 64×64 pixels, but the local region size is not limited thereto.

Each pixel that belongs to a local region in the learning sample image is specified in order as a center pixel by the block extractor 13. The block extractor 13 then extracts a pixel block centered on each center pixel. Hereinafter, the pixel blocks are described as being 3×3 pixels in size, but the pixel block size is not limited thereto.

The encoder 14 encodes the pixel values in a given pixel block into an 8-bit code using LBP (Local Binary Patterns). This 8-bit code is used as an index expressing the texture features for that extracted pixel block. More specifically, the pixel values of the eight pixels in the pixel block excluding the center pixel are compared to the pixel value of the center pixel. Pixel values that at least equal to the pixel value of the center pixel are encoded to 1, while pixel values less than the pixel value of the center pixel are encoded to 0. The encoded values are then ordered in a predetermined way to generate an 8-bit code. For more information on LBP, see, for example, T. Ojala, M. Pietikainen, and T. Maenpaa, "Multiresolution gray-scale and rotation invariant texture classification with Local Binary Patterns", IEEE Transactions on Pattern Analysis and Machine Intelligence 24(7), 971-987.

Obviously, the bit length of the generated code may be more or less than 8 bits when a pixel block size other than 3×3 pixels is used. For example, in the case of 4×4 pixel blocks, 15-bit codes may be generated. In the case of 5×5 pixel blocks, 24-bit codes may be generated.

Figure 4:
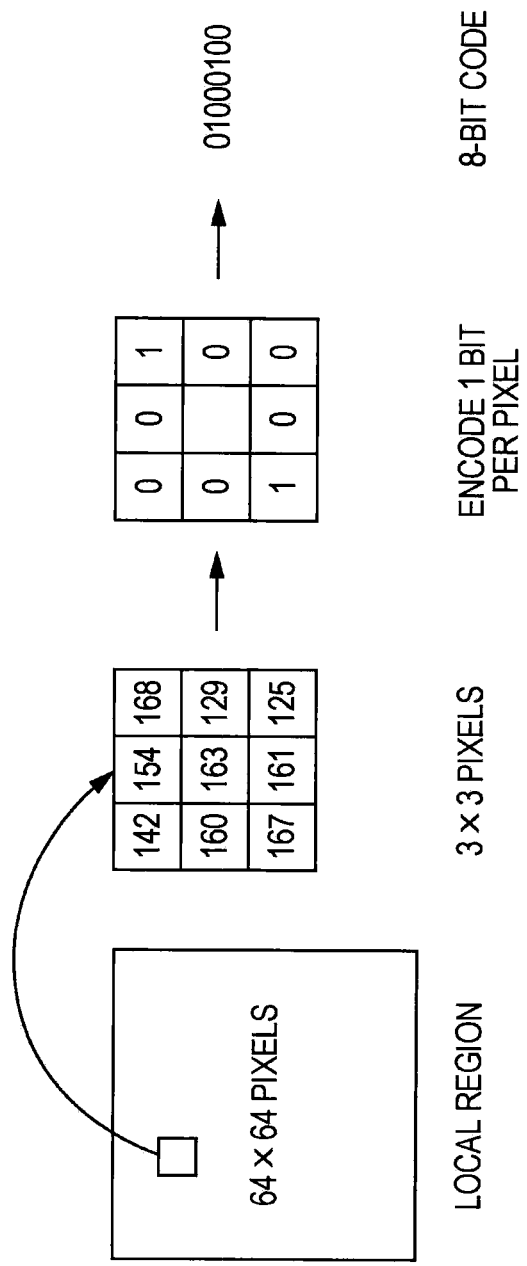
FIG. 4 is a diagram for explaining 8-bit encoding that expresses texture features.

FIG. 4 illustrates an example of 8-bit encoding performed by the encoder 14. In the example shown in FIG. 4, the pixel values of the 8 pixels in the pixel block excluding the center pixel are, when proceeding clockwise from the upper-left, 142, 154, 168, 129, 125, 161, 167, and 160, respectively. In this case, the pixel value of the center pixel is 163, and thus the pixel values are encoded to the 8-bit code 01000100.

Consequently, 4096 (=64×64) 8-bit codes per local region are obtained.

For each local region, the histogram generator 15 generates a histogram indicating how many times each code pattern occurs (hereinafter, such a histogram is referred to as a local region histogram).

Figure 5:
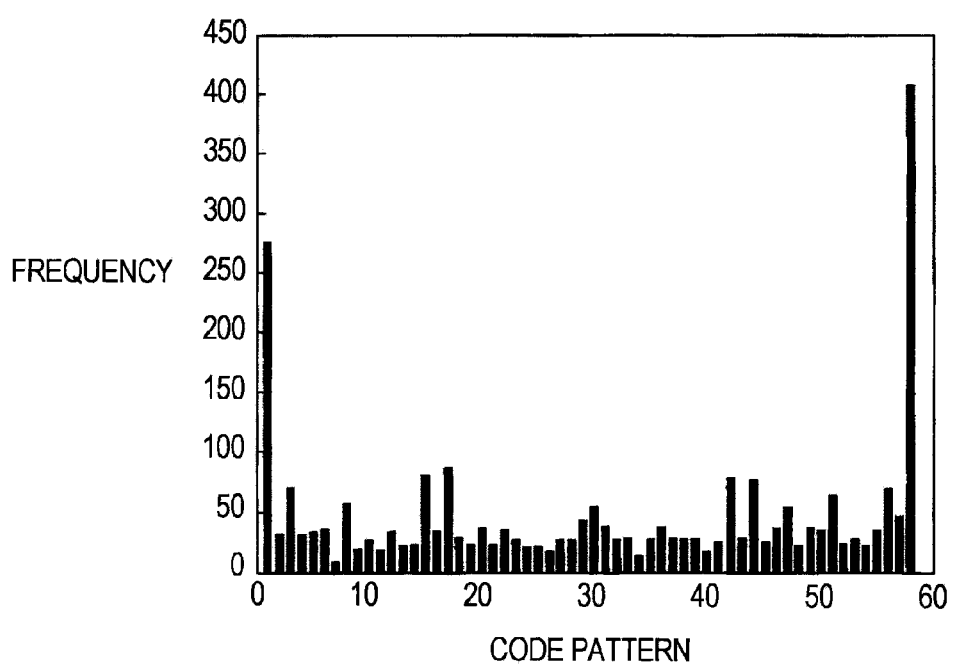
FIG. 5 is a histogram illustrating one example of a local region.

FIG. 5 illustrates an example of a local region histogram thus generated.

However, while 256 possible code patterns exist for an 8-bit code, using such code patterns as-is will lead to 256th order computation in the identification processing to be hereinafter described. For this reason, the number of code patterns is reduced from 256.

For example, T. Ojala, M. Pietikainen, and T. Maenpaa, "Multiresolution gray-scale and rotation invariant texture classification with Local Binary Patterns" state that the only 8-bit code patterns among the possible 256 that are effective in practice are the 58 patterns with no more than two bit flips (010, 101) in a single 8-bit code (such patterns are referred to as uniform patterns).

Thus, the present embodiment is not configured to generate a histogram for 256 code patterns, but is instead configured to generate a histogram for the 58 uniform patterns, as shown in FIG. 5. In so doing, the accuracy of the texture feature values is improved, while the complexity of the identification processing to be hereinafter described is reduced from 256th order computation to 58th order computation.

The number of reduced code patterns is not limited to 58, and may be any given number equal to or less than the total number 256.

The statistical learning unit 16 generates a feature value histogram for each tissue by using weighted addition to normalize the local region histograms for each tissue that has already been identified (i.e., AdaBoost learning).

Figure 6:
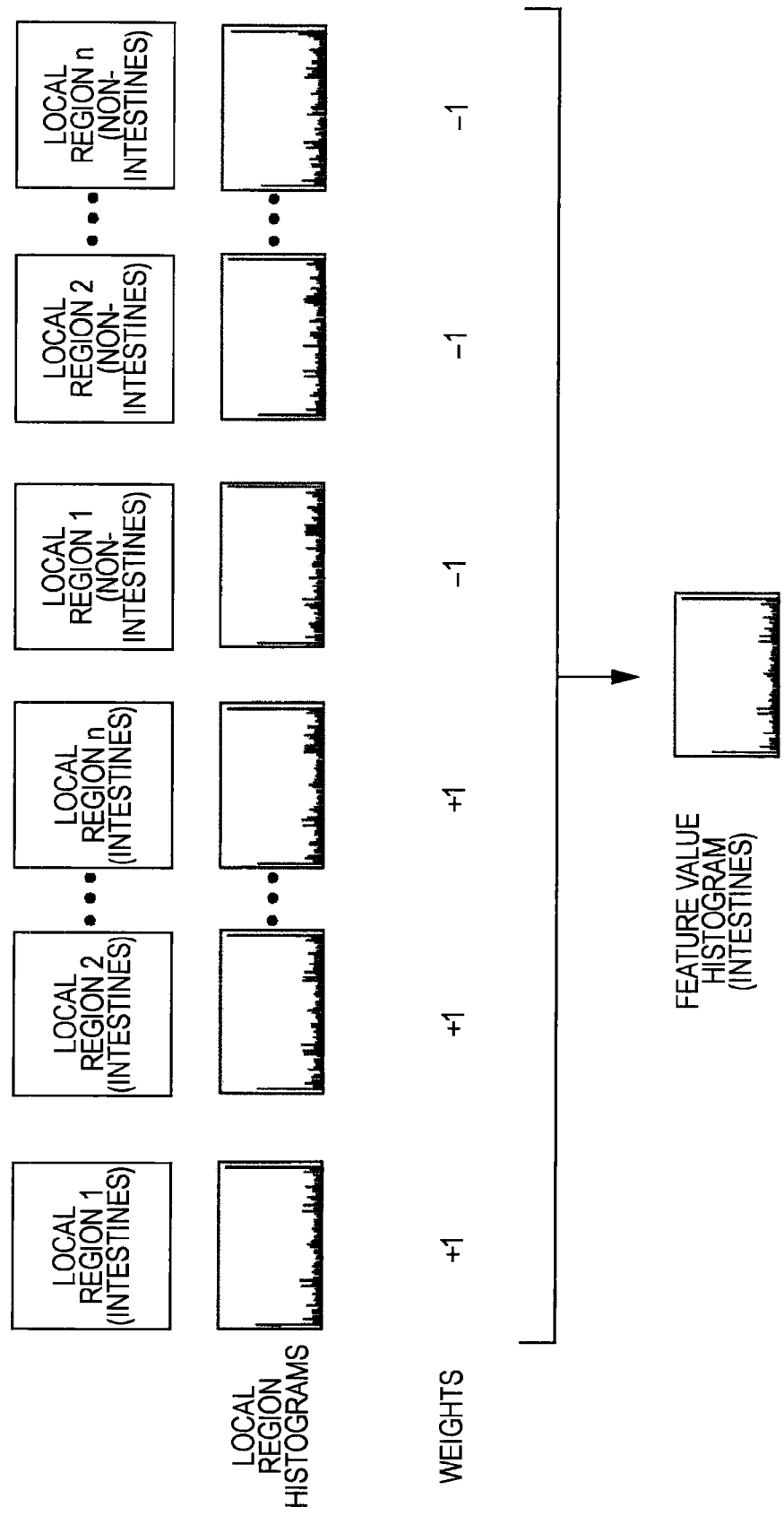
FIG. 6 is a diagram explaining weighted learning using local region histograms.

FIG. 6 illustrates the case of generating a feature value histogram for the intestines. Generating a feature value histogram for the intestines involves using both the respective local region histograms for a plurality of local regions already identified as the intestines in the learning sample image, as well as the respective local region histograms for a plurality of local regions already identified as something other than the intestines. The intestinal local region histograms are then weighted with a positive number (such as +1), while the non-intestinal local region histograms are weighted with a negative number (such as −1). All local region histograms are then added together and normalized.

Feature value histograms are similarly generated for other tissues such as the brain, liver, and bone. The feature value histograms thus generated for each tissue are stored in a feature value histogram storage unit 27 of the identification unit 21.

[Detailed Exemplary Configuration of Identification Unit 21]

The identification unit 21 includes a local region subdivider 22, a block extractor 23, an encoder 24, a histogram generator 25, a determining unit 26, and a feature value histogram storage unit 27.

The local region subdivider 22 subdivides an identification target image into local regions. The size of the resulting local regions is consistent with that of the local region specifier 12, and may be 64×64 pixels, for example.

Each pixel that belongs to one of the local regions into which the identification target image has been subdivided is specified in order as a center pixel by the block extractor 23. The block extractor 23 then extracts a 3×3 pixel block centered on each center pixel.

Similarly to the encoder 14, the encoder 24 uses LBP to encode the pixel values of the pixels (excluding the center pixel) in each extracted pixel block into an 8-bit code. Similarly to the histogram generator 15, the histogram generator 25 generates and normalizes a local region histogram for each local region, the local region histogram indicating how many times each code pattern occurs.

The determining unit 26 computes the Euclidean distance between the feature value histogram of each tissue stored in the feature value histogram storage unit 27 (i.e., a 58-dimensional vector) and the local region histogram of each local region in the identification target image input from the histogram generator 25 (i.e., a 58-dimensional vector). Furthermore, the determining unit 26 determines the tissue in each local region of the identification target image, on the basis of whether or not the Euclidean distance is equal to or less than a predetermined threshold value. For example, a local region is determined to be intestines if its Euclidean distance to the intestinal feature value histogram is equal to or less than the predetermined threshold value.

Figure 7:
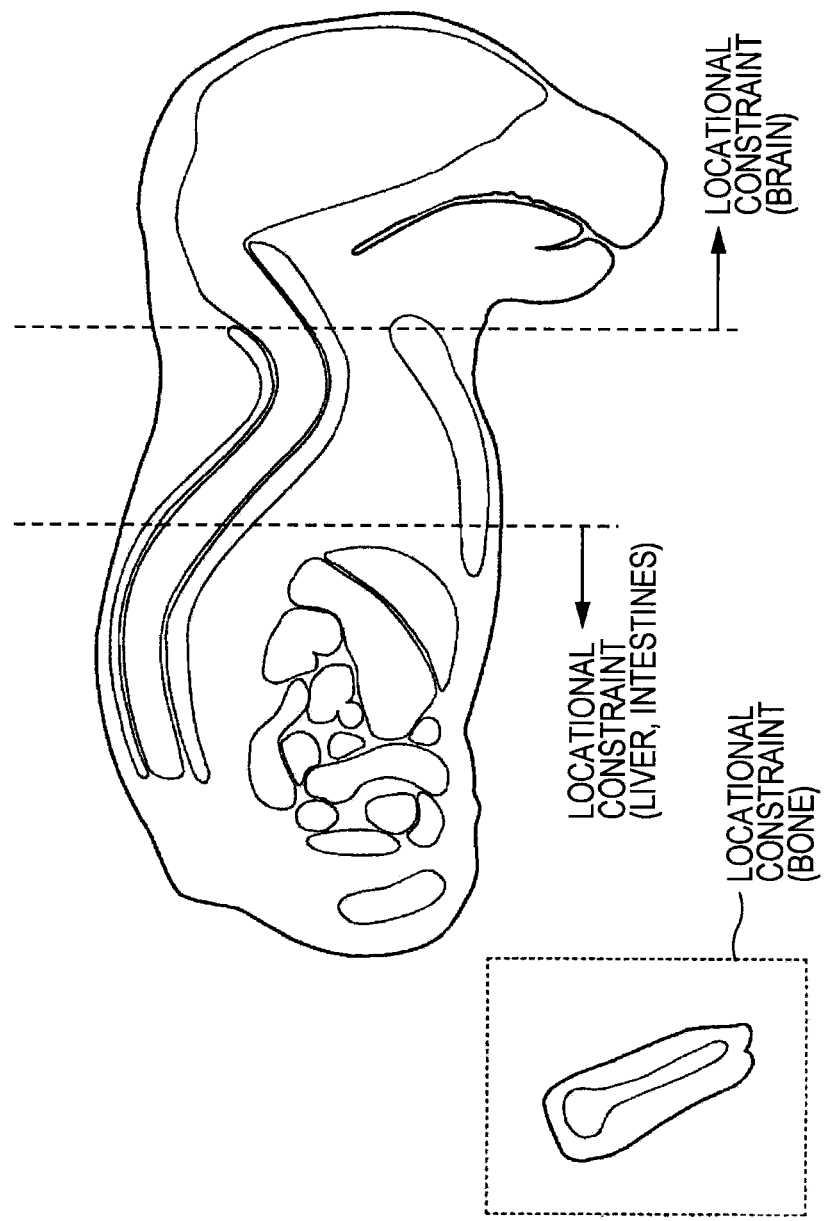
FIG. 7 is a diagram illustrating locational constraint parameters.

Furthermore, the determining unit 26 corrects the identification results by applying locational constraint parameters. Herein, locational constraint parameters are user-defined with respect to a location (i.e., region) in the identification target image, and specify the tissues likely to exist in that location, or in contrast, specify the tissues not likely to exist in that location. For example, in FIG. 7, it is specified that only the brain is likely to exist in the cephalic region, while only bone is likely to exist near the legs.

[Description of Operation]

Operation of the learning-based identification apparatus 10 will now be described.

Figure 8:
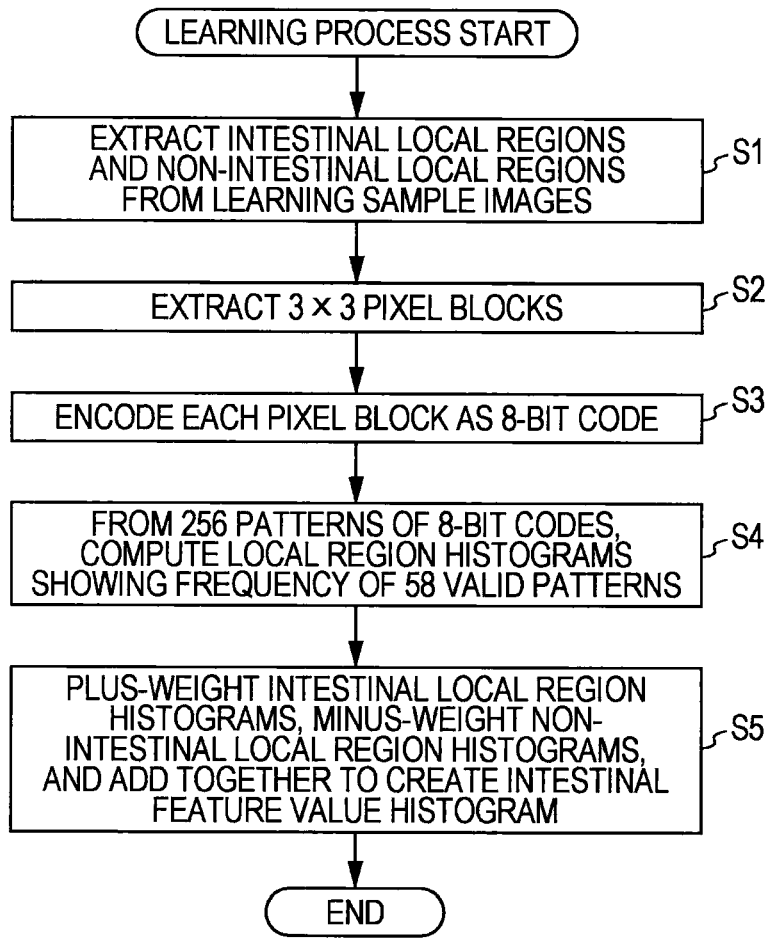
FIG. 8 is a flowchart explaining a learning process.

FIG. 8 is a flowchart explaining a learning process executed by the learning-based identification apparatus 10, herein showing the case of learning intestinal texture.

In step S1, the local region specifier 12 specifies local regions for a plurality of parts being identified as intestines from a learning sample image, and issues the results to the block extractor 13. Additionally, the local region specifier 12 specifies local regions for a plurality of parts being identified as non-intestines from a learning sample image, and issues the results to the block extractor 13.

In step S2, the block extractor 13 specifies, in order, each pixel belonging to a local region in the learning sample image as a center pixel. For each selected center pixel, the block extractor 13 extracts a 3×3 pixel block centered about the center pixel, and outputs the extracted pixel blocks to the encoder 14.

In step S3, the encoder 14 encodes the pixel values in each pixel block into an 8-bit code using LBP, and outputs the resulting 8-bit codes to the histogram generator 15.

In step S4, the histogram generator 15 generates a local region histogram for each local region, the local region histogram indicating how many times each code pattern occurs.

In step S5, the statistical learning unit 16 weights the intestinal local region histograms with a positive number (such as +1), and weights the non-intestinal local region histograms with a negative number (such as −1). The statistical learning unit 16 then adds together and normalizes all local region histograms to thereby generate a feature value histogram for the intestinal texture. In this way, by using weighted learning, a highly reliable feature value histogram with few misdetections can be generated.

In addition, the statistical learning unit 16 supplies the intestinal texture feature value histogram thus generated to the feature value histogram storage unit 27 of the identification unit 21.

It should be appreciated that feature value histograms are similarly generated for other parts, such as the brain, liver, and bone, and then supplied to the feature value histogram storage unit 27. The foregoing thus describes the learning process.

Figure 9:
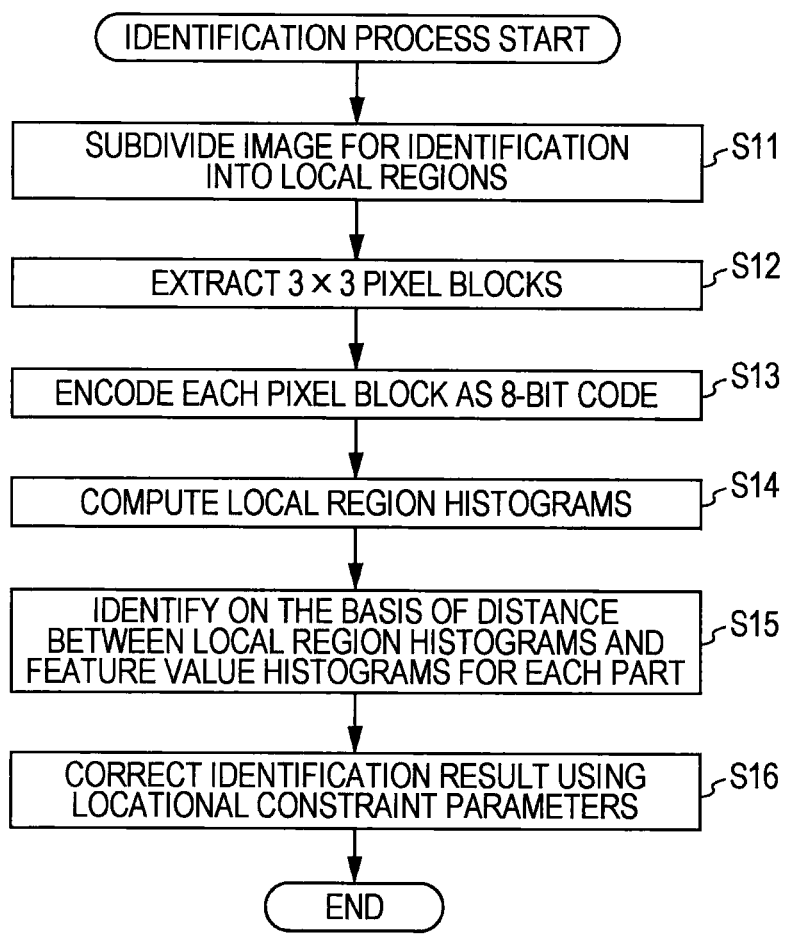
FIG. 9 is a flowchart explaining an identification process.

FIG. 9 is a flowchart explaining an identification process executed by the learning-based identification apparatus 10.

In step S11, the local region subdivider 22 subdivides an identification target image into local regions. In step S12, the block extractor 23 specifies, in order, each pixel belonging to one of the local regions into which the identification target image has been subdivided as a center pixel. The block extractor 23 then extracts a 3×3 pixel block centered on each center pixel.

In step S13, the encoder 24 uses LBP to encode the pixel values of each extracted pixel block into an 8-bit code. In step S14, the histogram generator 25 generates and normalizes a local region histogram for each local region, the local region histogram indicating how many times each code pattern occurs.

In step S15, the determining unit 26 computes the Euclidean distance between the feature value histogram of each tissue stored in the feature value histogram storage unit 27 (i.e., a 58-dimensional vector) and the local region histogram of each local region in the identification target image input from the histogram generator 25 (i.e., a 58-dimensional vector). Furthermore, the determining unit 26 determines the tissue in each local region of the identification target image, on the basis of whether or not the Euclidean distance is equal to or less than a predetermined threshold value. For example, a local region is determined to be intestines if its Euclidean distance to the intestinal feature value histogram is equal to or less than the predetermined threshold value.

In step S16, the determining unit 26 corrects the identification results by applying locational constraint parameters. By means of such correction, the identification accuracy is improved. The above thus describes the identification process.

As described in the foregoing, according to a learning-based identification apparatus 10, the textures of respective parts of a tissue image can be used as a basis for accurately identifying those tissues. Furthermore, according to a learning-based identification apparatus 10, tissues of various parts can be identified from images not limited to tomographs of tissue images.

The learning-based identification apparatus 10 in accordance with an embodiment of the present invention may be applied in the medical field, for example. As another example, such an apparatus may also be used to identify the lean and fatty portions of dietary meat, and use the ratio thereof as a basis for inspecting the quality of the meat.

It should be appreciated that the foregoing series of processes may be executed by means of hardware or software. In the case of execution by means of software, a program constituting such software may be installed from a program recording medium onto a computer built into special-purpose hardware. Alternatively, the program may be installed from a program recording medium onto an general-purpose personal computer or similar apparatus able to execute various functions by installing various programs thereon.

Figure 10:
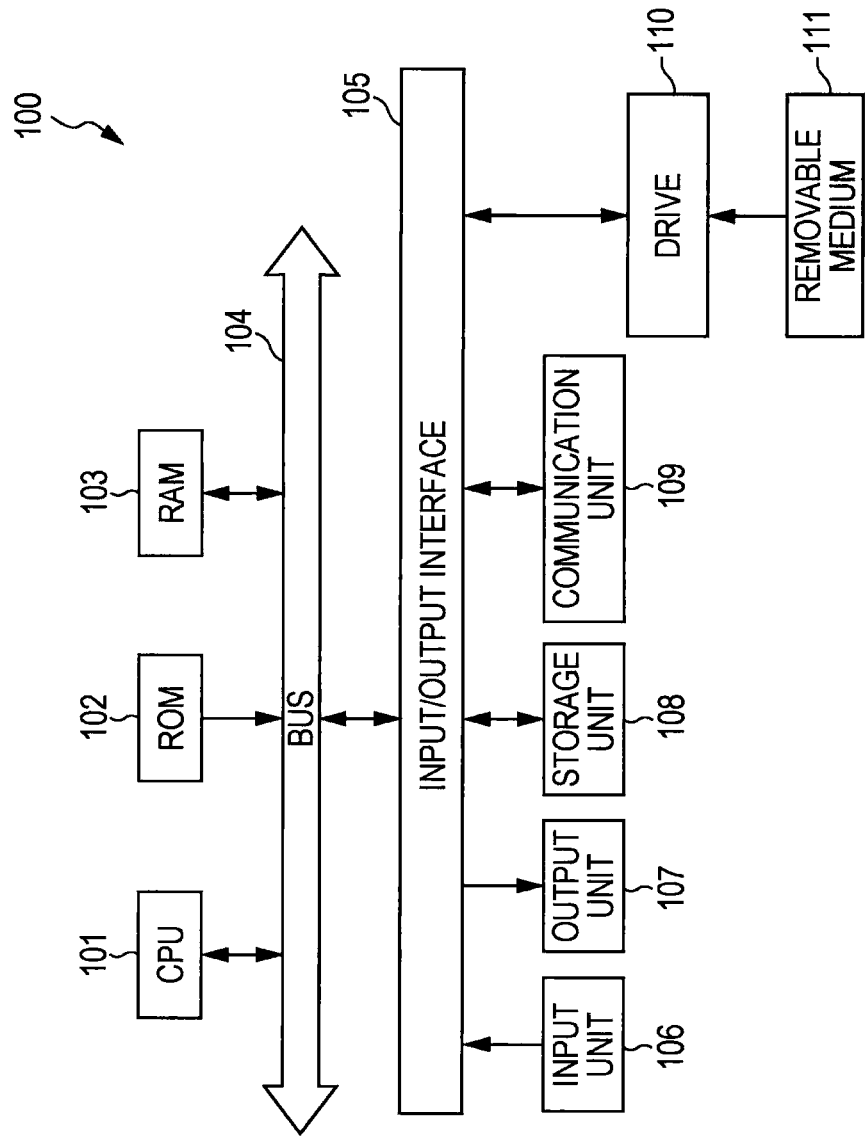
FIG. 10 is a block diagram illustrating an exemplary configuration of a general-purpose computer.

FIG. 10 is a block diagram illustrating an exemplary hardware configuration of a computer that executes the foregoing series of processes by means of a program.

In this computer 100, a CPU (Central Processing Unit) 101, ROM (Read-Only Memory) 102, and RAM (Random Access Memory) 103 are connected to each other by means of a bus 104.

Also connected to the bus 104 is an input/output interface 105. The input/output interface 105 is connected to the following: an input unit 106 that may include devices such as a keyboard, mouse, and microphone; an output unit 107 that may include devices such as a display and one or more speakers; a storage unit 108 that may include components such as a hard disk and non-volatile memory; a communication unit 109 that may include components such as a network interface; and a drive 110 that drives a removable medium 111, such as a magnetic disk, an optical disc, a magneto-optical disc, or semiconductor memory.

In a computer configured as described above, the foregoing series of processes may be conducted as a result of the CPU 101 loading a program stored in the storage unit 108 into the RAM 103 via the input/output interface 105 and the bus 104, and then executing the program, for example.

The program executed by the computer may be a program wherein process steps are conducted in a time series following the order described in the present specification. However, it should also be appreciated that the program may also be such that process steps are conducted in parallel or at appropriate timings, such as upon being called.

Furthermore, the program may be designed to be processed on a single computer, or processed in a distributed manner by a plurality of computers. Moreover, the program may also be transferred for execution on a remote computer.

In addition, in the present specification, a system is taken to express the totality of an apparatus made up of a plurality of apparatus.

It should also be appreciated that an embodiment of the present invention is not limited to the embodiment described in the foregoing, and that various modifications are possible without departing from the scope and spirit of the present invention.

The present application contains subject matter related to that disclosed in Japanese Priority Patent Application JP 2009-073143 filed in the Japan Patent Office on Mar. 25, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus configured to identify tissues in respective parts of a tissue image, comprising:
    a tissue image subdivider configured to subdivide the tissue image for identification into a plurality of detecting local regions;
    a detector configured to detect texture feature values of the detecting local regions; and
    a determining unit configured to compare a detected texture feature value of a detecting local region of the plurality of detecting local regions to a learned feature value for identification associated with a predetermined tissue and, on the basis of the comparison result, determine whether or not the detecting local region belongs to the predetermined tissue,
    wherein the detector includes:
    a first extractor configured to extract, from the tissue image for identification, detecting pixel blocks of predetermined size, each detecting pixel block being centered about a respective center detecting pixel in one of the detecting local regions into which the tissue image for identification was subdivided;
    a first encoder configured to generate detecting encoded code patterns such that, for each extracted detecting pixel block, pixel values of a plurality of non-centered detecting pixels belonging to that detecting pixel block are encoded into one of multiple possible code patterns based upon a comparison between each of the plurality of non-centered detecting pixels with the center detecting pixel; and
    a first generating unit configured to generate a detecting local region histogram for each specified detecting local region, the detecting local region histogram indicating respective occurrence frequencies of the detecting encoded code patterns and generated for use as the texture feature value of that detecting local region.

2. The image processing apparatus according to claim 1, further comprising:

a learning unit configured to learn the learned feature value for identification associated with the predetermined tissue.

3. An image processing apparatus configured to identify tissues in respective parts of a tissue image, comprising:
a tissue image subdivider configured to subdivide the tissue image for identification into a plurality of detecting local regions;
a detector configured to detect texture feature values of the detecting local regions;
a determining unit configured to compare a detected texture feature value of a detecting local region of the plurality of detecting local regions to a learned feature value for identification associated with a predetermined tissue and, on the basis of the comparison result, determine whether or not the detecting local region belongs to the predetermined tissue; and
a learning unit configured to learn the learned feature value for identification associated with the predetermined tissue,
wherein the learning unit includes:
a specifying unit configured to specify a learning local region for a part belonging to the predetermined tissue in a learning tissue image;
a first extractor configured to extract, from the learning tissue image, learning pixel blocks of predetermined size, each learning pixel block being centered about a respective center learning pixel in a specified learning local region;
a first encoder configured to generate learning encoded code patterns such that, for each extracted learning pixel block, pixel values of a plurality of non-centered learning pixels belonging to that learning pixel block are encoded into one of multiple possible code patterns based upon a comparison between each of the plurality of non-centered learning pixels with the center learning pixel;
a first generating unit configured to generate a learning local region histogram for each specified learning local region, the learning local region histogram indicating respective occurrence frequencies of the learning encoded code patterns; and
a computing unit configured to apply statistical learning using the generated learning local region histograms to compute a feature value histogram for use as the learned feature value for identification associated with the predetermined tissue.

4. The image processing apparatus according to claim 3, wherein the detector includes:
a second extractor configured to extract, from the tissue image for identification, detecting pixel blocks of predetermined size, each detecting pixel block being centered about a respective center detecting pixel in one of the detecting local regions into which the tissue image for identification was subdivided;
a second encoder configured to generate detecting encoded code patterns such that, for each extracted detecting pixel block, pixel values of a plurality of non-centered detecting pixels belonging to that detecting pixel block are encoded into one of multiple possible code patterns based upon a comparison between each of the plurality of non-centered detecting pixels with the center detecting pixel; and
a second generator configured to generate a detecting local region histogram for each specified detecting local region, the detecting local region histogram indicating respective occurrence frequencies of the detecting encoded code patterns and generated for use as the texture feature value of that detecting local region.

5. The image processing apparatus according to claim 3, wherein the computing unit applies AdaBoost learning based on a plurality of generated learning local region histograms to compute the learned feature value.

6. The image processing apparatus according to claim 4, wherein the computing unit applies AdaBoost learning based on a plurality of generated learning local region histograms to compute the learned feature value.

7. An image processing method for identifying tissues in respective parts of a tissue image, the method comprising the steps of:
providing an image processing apparatus;
subdividing, in the image processing apparatus, the tissue image for identification into a plurality of detecting local regions;
detecting, in the image processing apparatus texture feature values of the detecting local regions; and
comparing, in the image processing apparatus a detected texture feature value of a detecting local region of the plurality of detecting local regions to a learned feature value for identification associated with a predetermined tissue and, on the basis of the comparison result, determining whether or not the local region belongs to the predetermined tissue,
wherein the detecting step comprises:
extracting, from the tissue image for identification, detecting pixel blocks of predetermined size, each detecting pixel block being centered about a respective center detecting pixel in one of the detecting local regions into which the tissue image for identification was subdivided;
generating detecting encoded code patterns such that, for each extracted detecting pixel block, pixel values of a plurality of non-centered detecting pixels belonging to that detecting pixel block are encoded into one of multiple possible code patterns based upon a comparison between each of the plurality of non-centered detecting pixels with the center detecting pixel; and
generating a detecting local region histogram for each specified detecting local region, the detecting local region histogram indicating respective occurrence frequencies of the detecting encoded code patterns and generated for use as the texture feature value of that detecting local region.

8. An non-transitory computer readable storage medium storing a computer program, which when executed by a computer, performs the following steps:
subdividing a tissue image for identification into a plurality of detecting local regions;
detecting texture feature values of the detecting local regions; and
comparing a detected texture feature value of a detecting local region of the plurality of detecting local regions to a learned feature value for identification associated with a predetermined tissue and, on the basis of the comparison result, determining whether or not the local region belongs to the predetermined tissue, wherein the detecting step comprises:
extracting, from the tissue image for identification, detecting pixel blocks of predetermined size, each detecting pixel block being centered about a respective center detecting pixel in one of the detecting local regions into which the tissue image for identification was subdivided;

generating detecting encoded code patterns such that, for each extracted detecting pixel block, pixel values of a plurality of non-centered detecting pixels belonging to that detecting pixel block are encoded into one of multiple possible code patterns based upon a comparison between each of the plurality of non-centered detecting pixels with the center detecting pixel; and generating a detecting local region histogram for each specified detecting local region, the detecting local region histogram indicating respective occurrence frequencies of the detecting encoded code patterns and generated for use as the texture feature value of that detecting local region.

9. The image processing apparatus according to any of claim 1, 2, 7, 8, or 4 wherein the detecting encoded code patterns are generated by means of Local Binary Patterns.

10. The image processing apparatus according to any of claim 3, 4, 5, or 6 wherein the learning encoded code patterns are generated by means of Local Binary Patterns.

11. The image processing apparatus according to any of claim 1, 2, 3, 7, 8, 4, 5, or 6, wherein the tissue image is a virtual slide.

\* \* \* \* \*